United States Patent [19]

Persoons et al.

[11] 4,287,707
[45] Sep. 8, 1981

[54] HARVESTERS

[75] Inventors: Gustaaf M. Persoons, Schoten, Belgium; Corneel C. Wijts, San Jose, Calif.

[73] Assignee: FMC Corporation, San Jose, Calif.

[21] Appl. No.: 49,696

[22] Filed: Jun. 18, 1979

Related U.S. Application Data

[62] Division of Ser. No. 686,604, May 14, 1976, Pat. No. 4,178,743.

[51] Int. Cl.³ .................................................. A01D 45/22
[52] U.S. Cl. .................................. 56/12.8; 209/3; 209/137; 209/147; 56/130
[58] Field of Search ............... 56/12.8, 12.9, 13.3, 56/126–130, 240; 209/3, 133–137, 143, 147, 421, 470; 406/169

[56] References Cited

U.S. PATENT DOCUMENTS

| | | | |
|---|---|---|---|
| 1,137,184 | 4/1915 | Brugge | 209/135 |
| 1,454,071 | 5/1923 | Owens | 56/12.9 X |
| 1,843,404 | 2/1932 | Rosmussen | 209/421 X |
| 2,693,068 | 11/1954 | Rodin | 209/136 X |
| 3,105,784 | 1/1965 | Osteen | 56/12.9 X |
| 3,306,018 | 2/1967 | Whitman | 209/133 X |
| 3,446,347 | 5/1969 | French | 209/3 |
| 3,555,794 | 1/1971 | Gable | 209/136 X |
| 3,596,716 | 8/1971 | Hoffman | 209/136 X |
| 3,705,483 | 12/1972 | Jarrell | 56/13.5 |
| 3,929,628 | 12/1975 | Denevi | 209/147 X |
| 3,962,072 | 6/1976 | Ramacher | 209/138 X |

FOREIGN PATENT DOCUMENTS 1291555 10/1972 United Kingdom ................ 209/421

*Primary Examiner*—Robert Halper
*Attorney, Agent, or Firm*—L. J. Pizzanelli

[57] ABSTRACT

A harvester for beans and like crop includes a pick-up reel having a width equal to the overall width of the harvester and leading to a first, cleaning, conveyor which terminates at an air passage incorporating a fan for generating a generally vertical air flow. Where the vertical air passage meets the cleaning conveyor, a rotary valve is provided which permits the passage of the beans and other parts of the crop but prevents or at least restricts the passage of the air flow into the space above the upper run of the conveyor.

The rotary valve may take the form of a rotary vaned assembly having six vanes each of which is secured to one face of a hexagonal shaft and various forms of rotary valve are also described.

11 Claims, 15 Drawing Figures

HARVESTERS

This is a division of application Ser. No. 686,604 filed May 14, 1976, now U.S. Pat. No. 4,178,743.

SUMMARY OF THE INVENTION

This invention relates to harvesters and in particular bean harvesters.

Numerous bean harvesters have been proposed and some of these proposals have been constructed and made available on the market. A successful bean harvester has the following features:

1. the crop collected should be as clean as possible;
2. the loss of crop should be kept to a minimum;
3. the damage to standing crop not yet harvested should be kept to a minimum;
4. the harvester should be highly maneuverable and the parts should be readily accessible;
5. the harvester must be robust and capable of withstanding the arduous conditions and absence of maintenance encountered in the field;
6. the overall weight should be kept as low as possible;
7. the harvester should be capable of accommodating without loss of crop-picking efficiency, variations in ground contour;
8. the harvester should be capable of harvesting crop irrespective of whether or not it is planted in rows;
9. it should be possible to clean the machine without substantial dismantling;
10. the hopper or other store should be capable of discharge to a lorry or other vehicle without appreciable delay and irrespective of the height of the other vehicle; and
11. the harvester should be highly maneouvrable on the roads and when moving away from the fields.

Various harvesters have been proposed which partially satisfy these requirements but as will be appreciated, taken together, there are onerous and not readily fulfilled.

It is an object of the present invention to fulfil as many as possible of these objectives in a machine which is not unduly complex and the cost of which remains competitive.

According to the present invention there is provided a cleaning stage of a harvester for beans or the like comprising an inclined conveyor for material to be cleaned, a casing spaced from the conveyor, movable valve means at the upper run of the conveyor cooperating with an adjacent part of the casing and with the conveyor, and means for producing an air flow in a passage to separate lighter from heavier crop components, said movable valve means serving to permit the delivery of the material on the upper run of the conveyor to the passage but to restrict air flow between the casing and the upper run of the conveyor.

Further according to the present invention, there is provided a harvester assembly arranged for mounting on a tractor, said assembly comprising a forward crop pickup device, a first, rearwardly-extending, conveyor arranged to receive crop from the pick-up device with the end thereof adjacent to the pick-up device being spaced closely thereto and an end thereof remote from the pick-up device lying adjacent a closure arrangement capable of permitting the passage of crop on the conveyor upper run while restricting air flow to the conveyor upper surface, means defining a generally vertical passage immediately downstream of said remote end of the conveyor, said passage communicating with a suction device to produce an upward air flow therein whereby at least partially to separate heavier from lighter elements of the crop received in the passage from the conveyor, and said passage being partially obstructed at its lower end by a second, transversely-extending, conveyor for conveying away said heavier elements and the remaining lighter elements a third, rearwardly-extending, conveyor for transporting the heavier elements and the remaining lighter elements to a second, generally vertical passage, said second passage having a second suction device communicating therewith to produce an upward air flow whereby further to separate remaining lighter elements from the heavier elements, and a fourth conveyor one end of which defines, together with a rearward end of the third conveyor a part of the second passage, said fourth conveyor serving to conduct the heavier elements to a store.

Yet further according to the present invention there is provided a bean harvester assembly comprising a crop pick-up device having a width equal at least to the overall width of the harvester assembly as a whole and a device for separating heavier from lighter elements of the crop delivered thereto from the pick-up device, said separating device having a width substantially equal to that of the pick-up device.

Still further according to the present invention there is provided a bean harvester assembly comprising a pick-up device for the crop, a conveyor for receiving crop from the pick-up device and a separating device formed by a generally-vertical passage in communication with an air flow generator, the pick-up device, the conveyor and the separating device being pivotal in relation to remaining parts of the harvester assembly to facilitate movement of the assembly when it is in operation.

An embodiment of a bean harvester assembly in accordance with the invention will now be described by way of example, with reference to the accompanying diagrammatic drawings, in which:

DESCRIPTION OF THE PREFERRED EMBODIMENTS

Figure 1A:
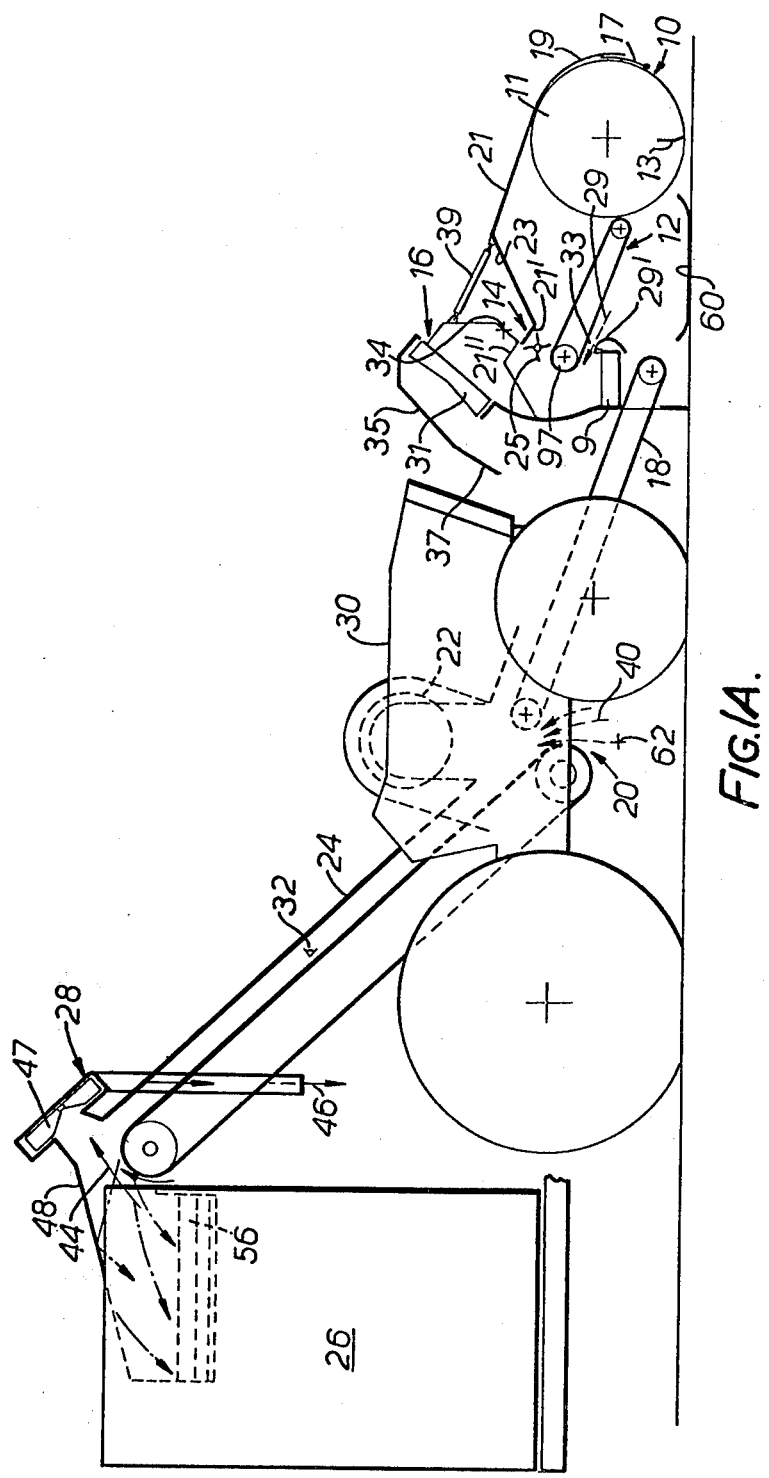
FIG. 1A shows an outline side elevation of a bean harvester assembly in accordance with the invention.

Referring now to the drawings, in general terms the bean harvester assembly comprises a forward pick-up device 10, which supplies the crop to a first, rearwardly-extending, conveyor 12, arranged immediately rearwardly of the pick-up device 10, a first crop-separating or cleaning stage or section 14 arranged rearwardly of the first conveyor and including a bank of blowers or fans 16 by which 90% of the crop product is separated from leaves and other waste materials. Beans, partially-cleaned at the first cleaning stage, fall onto a second, transverse, conveyor 9. Rearwardly of the crop-separating section 14, a third, rearwardly-extending conveyor 18 is provided which leads to a second crop-separating or cleaning stage or section 20 which includes at least one fan or blower 22 or other suction device and co-operates to remove the crop product with an inclined, rearwardly-extending, fourth conveyor 24 leading to the inlet of a hopper 26. The conveyor 24 has, mounted on stationary structure thereof, a further fan which forms part of a third, and final cleaning stage or section 28. The hopper 26 is preferably mounted on an overhanging framework 29 in order at least partially to counterbalance the weight of the pick-up device 10 and associated parts arranged to be mounted forwardly of the tractor illustrated very diagrammatically at 30.

Turning now to details of the harvester assembly, it is arranged as stated above to be mounted on a tractor which reduces the initial cost, provides for greater flexibility in use and has the advantage that the power plant incorporates components which are usually readily locally available to the user. The approximate position of the eyes of the driver of the tractor is indicated at 32.

The pick-up device 10 comprises a reel 11 having a plurality of generally radially-extending tines 13 only one of which is illustrated in the drawing for the sake of simplicity. The reel 11 is mounted for rotation by means (not shown) on a frame (not shown) extending generally longitudinally on both sides of the tractor. The drive means may comprise chains driven by a hydraulic motor (not shown). The tines 13 of the pick-up reel 11 have outer portions which are slightly inclined to the generally radially-extending inner portions thereof. This arrangement assists in lifting the bean plants during the picking action. A casing end portion 17 of sheet metal is slidably mounted within an end portion 19 of a main picking reel casing 21 (see FIG. 1A) and follows closely the periphery of the outer tips of the picking reel tines 13. This casing portion 17 is made adjustable so that when large bean plant height differences are encountered, product loss in that area is avoided. The upper part of the casing 21 becomes progressively further spaced from the periphery of the tines 13 and extends in an inclined direction generally rearwardly to a transverse ridge 23 from which it is inclined downwardly and rearwardly to an edge adjacent to a rear end of the inclined first conveyor 12 of the harvester.

The first conveyor 12 extends at an angle of approximately 20° to the horizontal from a position closely spaced to the reel 11 at approximately the 9 o'clock position thereof and the conveyor is mounted for movement over two rollers of conventional design. The belt of the conveyor 12 carries equally-spaced 10 mm. transverse flights (not shown). The first conveyor may be chain driven from the same hydraulic motor as that used to drive the reel 10. Alternatively, two hydraulic motors may be incorporated, one on each side of the harvester, both being drivingly coupled to the reel and the first conveyor. The edge hereinbefore referred to adjacent the upper end of the first conveyor 12 connects with an upwardly-inclined portion 21' of the casing which in turn connects with a further upwardly-inclined portion 21"; the casing partially accommodates a rotary flap valve or other rotary vaned member 25 incorporating four or possibly six flexible vanes (described in detail hereinafter). The vanes almost touch the inclined portion 21' of the casing referred to and the path of the tips of the vanes also comes into close proximity with the upper end of the first conveyor 12 at a position where it passes around the upper roller of the first conveyor. The rotary vane member 25 is so rotated that the tips of the flexible vanes move in the same sense as, and with a peripheral speed equal to the speed of the upper run of conveyor 12. The diameter of the member 25 will be approximately twice that of the adjacent conveyor belt roller. This arrangement assists the cleaning efficiency by preventing stray air flows from upsetting the fan induced flows in the first cleaning stage or section. The ratio of the diameter of the rotary vane member 25 to the diameter of the upper belt roller 97 may be in the range 1:1 to 2:1.

Alternatives to the flap valve illustrated in FIG. 1A are shown in FIGS. 2A to 2H. These will be described hereinafter.

The rotary vane member 25 with flexible flaps or vanes serves to minimize the passage of air between the upper end of the conveyor 12 and the casing portion 21' since otherwise substantial air flow will be drawn by the fans from the area above the conveyor 12. This air flow, since it does not pass through the product to be cleaned, will not remove leaves and waste from the beans. Further, this air flow would obstruct efficient air flow through a passage 33 extending between the lower run of conveyor 12 and the conveyor 9, such that a very poor cleaning efficiency in this first stage would be obtained.

The second, transverse, conveyor 9 lies immediately rearwardly of and below the upper end of the first conveyor 12 and defines the bottom of the first air separating or cleaning passage 33 which extends over the whole width of the harvester and corresponds at least in substance to the width of the pick-up reel 11. The air flow 29 (indicated by a broken line arrow) through the passage 33 passes to the bank 16 of five fans 31 driven by hydraulic motors through a V-belt transmission (not shown). As will be apparent from FIG. 1A the lower end of the passage 33 is very wide thus avoiding high air velocities which might draw loose soil into the passage under dry and dusty conditions which are sometimes encountered at harvest time.

The transverse conveyor 9 extends across a major proportion of the width of the first cleaning passage and its direction of motion is such that the upper run thereof discharges a mixture of crop product and waste onto a lower end portion of the third conveyor 18 which is mounted to extend along one side of the tractor, i.e., laterally of the longitudinal centre line of the harvester assembly.

Downstream of the bank of fans 16 there is a discharge passage 35 which ends in a diffusing section 37 serving to reduce the velocity of air and of the discharged leaves and other waste for the purpose of minimizing blowing of dust under dry conditions. The bank of fans 16 together with the discharge passage 35 is mounted at a pivot connection 34 (see FIG. 1A) or fan hinge point on the framework of the pick-up, which matches with the end of cover 21 and two hydraulic cylinders 39 keep the cleaning arrangement as a whole in its elevated condition (see FIG. 3B).

As such, this cleaning arrangement can be pushed down to provide maximum visibility for the machine driver (see FIG. 1A) by cylinders 39 when the pick-up device as a whole has been lifted for road transport. This hydraulic control is combined with a hydraulic levelling system of the pick-up device as will be described hereinafter with reference to FIG. 5.

The visibility provided is at least as good as when the pick-up device is in its working position in the field.

The third conveyor 18 extends rearwardly at a slight angle to the horizontal of, for example, 15° to 20° and like the first conveyor is provided with transverse bars or flights (not shown).

The rearward end of this third conveyor 18 is arranged to discharge the crop product and remaining dirt and leaves onto a lower end portion of the fourth conveyor or elevator 24. The adjacent ends of these conveyors 18 and 24 are spaced apart to enable passage of a generally vertical air flow indicated by broken line arrows 40 which flow is drawn upwardly by the fan or blower 22 rotatable about a horizontal axis transverse to the longitudinal direction of the harvester. As will be apparent from arrows 40 illustrated in FIG. 1A, the trajectory of the beans or other useful product crop is approximately at right-angles to the direction of the airflow, thus ensuring as far as possible that the leaves and other waste are almost completely separated from the beans. The fan 22 of the second cleaning stage or section is arranged to discharge the air and waste on the same side of the tractor as the elevator 24 in the already harvested area but because of the low velocity of the discharge air there will be little disturbance of the soil, even under dry conditions.

The forth, rearwardly-extending conveyor or elevator 24 has appropriate flights of from 75 to 100 mm. height (not shown) which ensure that the bean pods are satisfactorily elevated to the upper end of the conveyor where they are discharged onto the transverse hopper conveyor 56 where indicated by chain line arrows. The hopper conveyor 56 discharges into the hopper 26.

At the discharge end of the elevator 24 there is a fan 47 rotatable about an inclined axis, see FIG. 1A, positioned on the elevator frame. Split ducting 48 controls the air flow through the product and the trajectory of the product on to a hopper conveyor 56, which ejects the beans into the hopper. The fan 47 and a first part of the ducting 48 do not move when the hopper is tilted for dumping. The second half of the ducting and the hopper conveyor 56 are mounted on the hopper and thereafore they will move with the hopper during dumping. As in the penultimate cleaning stage, the fan 47 draws an air mass through the product which traverses this air flow first at right-angles and then in the opposite sense as indicated by the full line arrows 44. Any remaining trash, dust or sand is removed at this stage of operation as indicated by broken line arrows 46 and discharged on to the harvested area. This final cleaning stage may be omitted if cleaning is adequately achieved by the earlier stages.

Figure 1B:
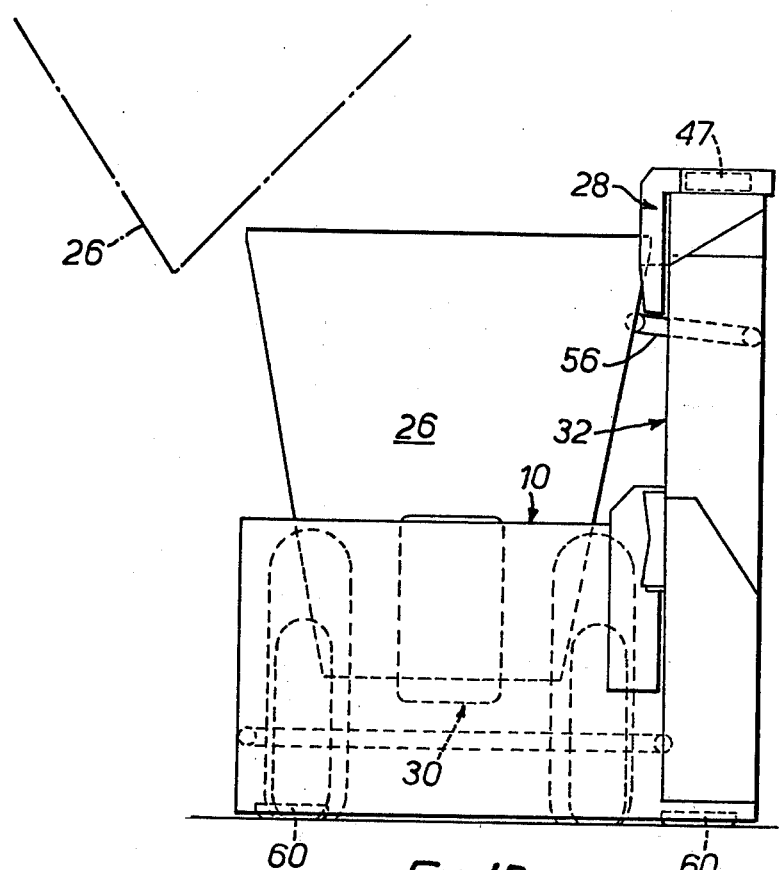
FIG. 1B is a front elevation of the harvester assembly of FIG. 1A.
Figure 1C:
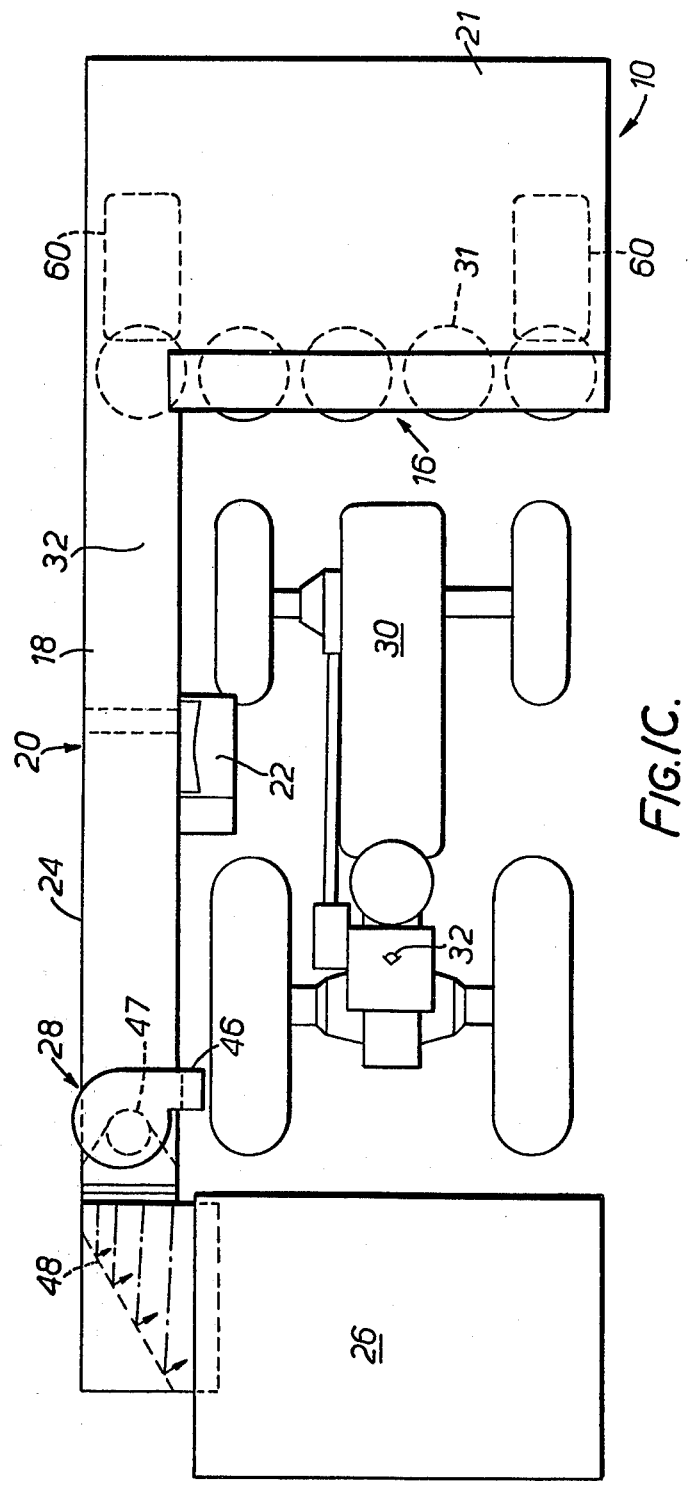
FIG. 1C is a plan view of the harvester assembly of FIGS. 1A and 1B.

The second half of the ducting 48 is made of portions inclined lengthwise as can be seen in FIG. 1A and transversely as can be seen in FIG. 1C. These ducting portions provide a spread-out of the beans onto the wide hopper conveyor 56 so that the hopper will be evenly filled lengthwise as indicated in FIGS. 1A and 1C by chain lines.

An oil reservoir (not shown) for the hydraulic system is mounted on a frame laterally of the hopper 26, and thus balances of off-centre loading of the pick-up device and the conveyors 18 and 24 which extend alongside the tractor.

Figure 3A:
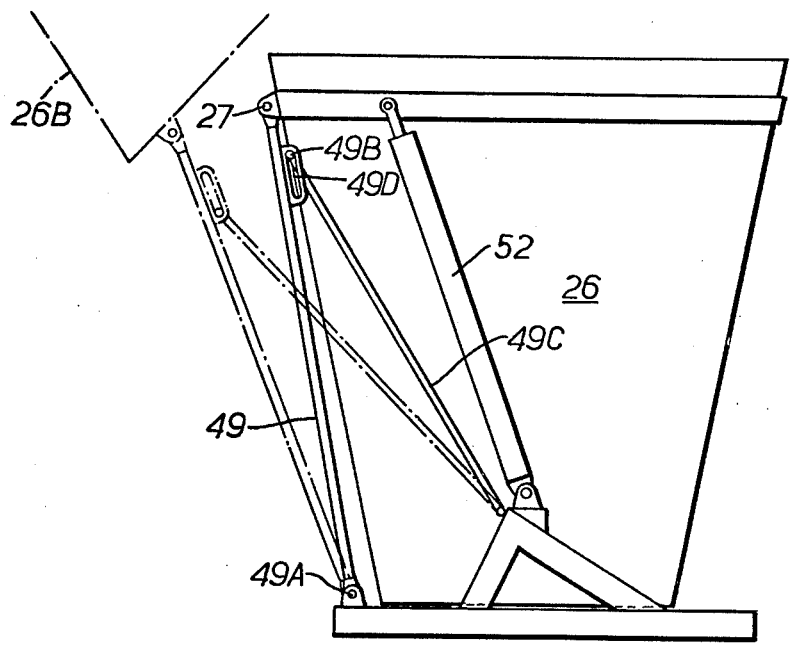
FIG. 3A is a side elevation of a hopper arrangement of the harvester assembly showing in broken lines the hopper being tilted in an elevated condition towards a discharge configuration.
Figure 3B:
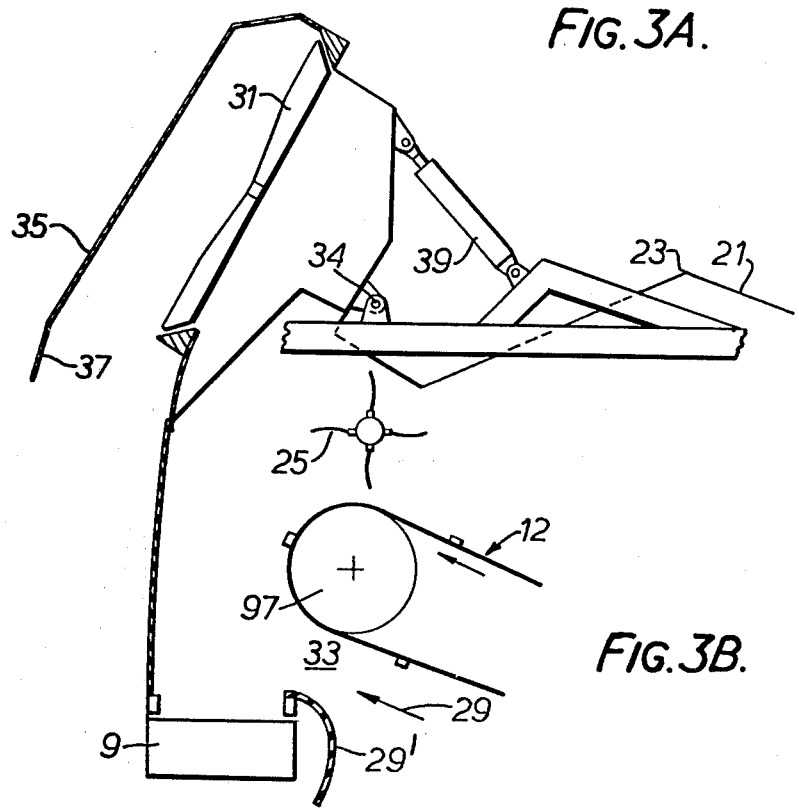
FIG. 3B is a fragmentary side elevation showing one of the cleaning stages of the harvester assembly.

Two alternative hopper systems may be used. The first being a simple "tilt-slide" hopper as seen in FIGS. 1B and 3A. The hopper 26 is tilted such that the right-hand wall assumes an inclination of approximately 45° to allow a complete removal of all product into a mobile receptacle, such as a lorry or truck (not shown).

To avoid dangerous and difficult manoeuvering for this receptacle to get close enough to the machine to receive the product without losses, the hopper will first be swung out as can be seen in FIG. 3A. The hopper 26 is for this reason attached pivotally at 27 to a pivot-frame 49 which, in turn, is pivotally mounted at 49A on the hopper supporting frame.

When hydraulic actuators 52 exert a force against the hopper 26 this will swing out about 27 until pins 49B of bars 49C have travelled along the slots 49D in the pivot frame and limit further lateral movement of the complete structure. The actuators 52, by continuing to exert a force on the hopper, cause it to pivot fully around pivot 27 into the dump position 26B (chain lines).

When the actuators 52 are retracted, the hopper 26 will first come down again and then be retracted about pivot 27 into its initial position.

Figure 4:
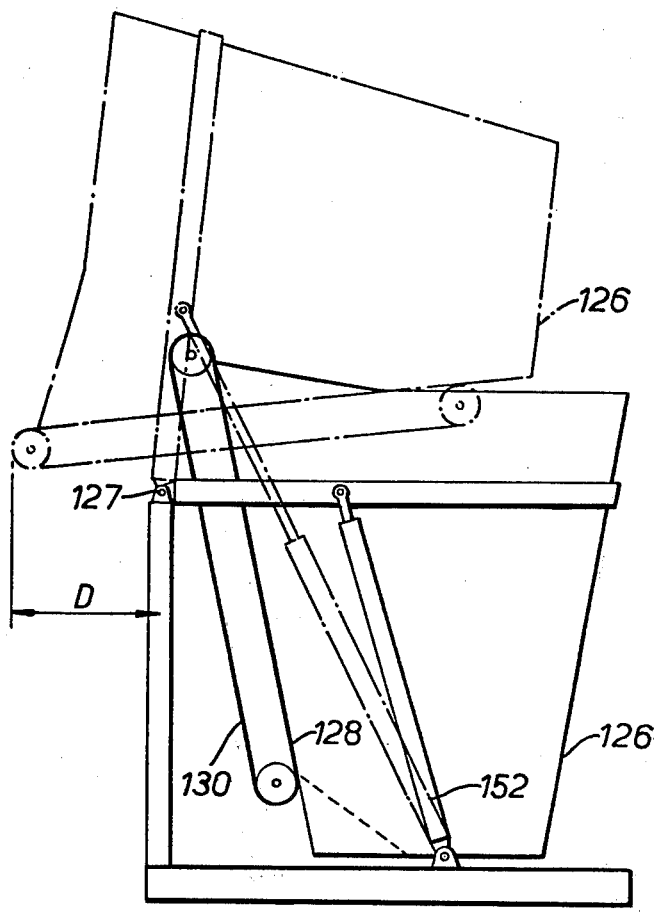
FIG. 4 is a side elevation of an alternative hopper arrangement.

A second, alternative, hopper system is shown in FIG. 4. Most of the hopper 126 is formed from conventional sheet metal, except for one side wall 128 which is formed by an upper run of a conveyor 130 reinforced to carry the total product weight carried by the hopper. An initial part of the stroke of the hydraulic actuators 152 lifts the hopper and pivots it about pivot 127 spaced by distance D below an upper roller of the hopper wall conveyor 130. The hopper is lifted as the actuators continue their strokes until the hopper wall conveyor 130 has an inclination of approximately 5° to the horizontal (chain lines in FIG. 4).

Dumping is assisted by driving the hopper wall conveyor 130 by a hydraulic motor (not shown) so that the total product mass is progressively and controllably discharged from the hopper and dumped into a mobile receptacle alongside the harvester. The distance "D" provides a saft overhang, a similar limit being applied to the hopper of FIG. 3A. Advantages of the system of FIG. 4 are:
  dumping can be controlled, e.g. when the drive of the conveyor is stopped, the product stops in that position;
  the hopper need not be lifted too far so that the centre of gravity of the total machine remains low and as such stable;
  the hopper need not swing out significantly so that the centre of gravity remains close to the machine axis, and again stability results.

The picking reel 10, the conveyors 12, 9 and 18 are all mounted on a framework pivotal at 62 on a fixed frame (neither frame shown). One or two hydraulic actuators (not shown) act directly between the fixed and pivotal frames to raise the pivotal frame when the harvester is inoperative. The bank of fans 16 and associated ducting is separately pivoted to retract it downwardly and thus avoid obstructing the driving view. The absence of springs in the connection between the frames ensures that the pivotal frame will not bounce when operating in the field.

Figure 2A:
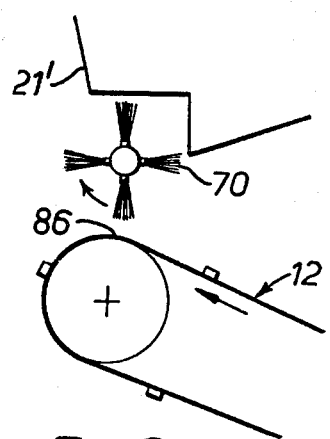
FIGS. 2A and 2H illustrate possible alternative constructions of one detail of one cleaning stage of the harvester assembly as illustrated in FIG. 1.

Referring now to the possible alternatives to the arrangement which limits the flow of air over the exit of the first conveyor, as illustrated in FIG. 2A the rotary vane valve 25 is replaced by valve means in the form of a similar transversely-extending member 70 incorporating four elongate brushes. In general, such an arrangement would be less satisfactory than the preferred arrangement since although flexible, brushes unless very dense, and hence costly, have a tendency to pass a substantial airflow in themselves.

Figure 2B:
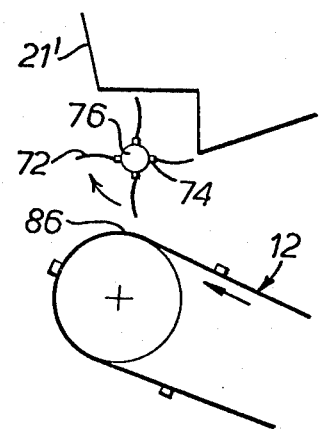

In the arrangement illustrated in FIG. 2B, the vanes are replaced by rubber flaps 72 each mounted on a transverse bar 74 secured to a shaft 76 of the valve. The operation of this arrangement would in substance be the same as the preferred arrangement described in detail above.

Figure 2C:
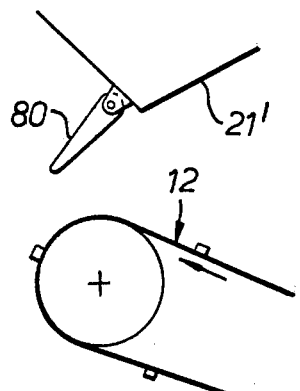
Figure 2E:
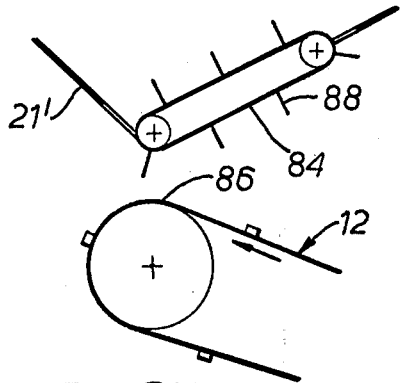

In the modification illustrated in FIG. 2C, the rotary vane valve 25 is replaced by a spring-loaded single flap 80 but the spring loading must be light in order to avoid damage to any crop product and it is difficult to achieve a successful compromise in which the spring loading is sufficient light to prevent this damage but sufficiently strong to prevent the flap being moved by the suction effect caused by the bank of fans 16.

Alternatively the flap 80 may be locked mechanically in selected positions. This, however, can be dangerous for block-ups of product against this fixed flap as the passage must be kept small to reduce the sucking of useless air.

Figure 2D:
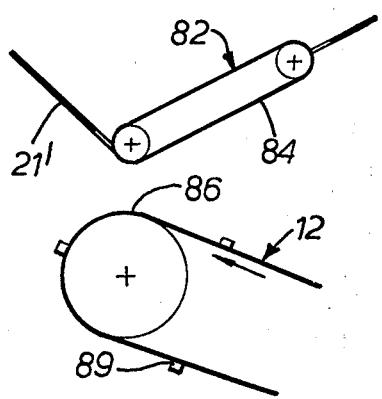
Figure 2F:
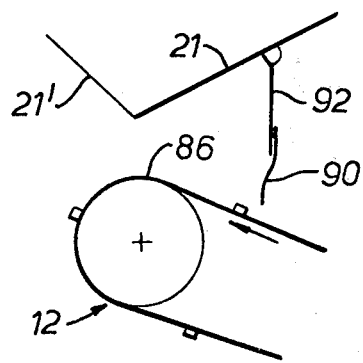

FIG. 2D includes an auxiliary belt 82, a lower run 84 of which is inclined and is spaced from the upper end portion 86 of the first conveyor belt 12. This auxiliary belt has the advantage that crop damage and block-up is minimized but unless the belt is spring mounted in some way, there is a risk of crop damage and block-up in the event of a large number of beans attempting to leave the discharge end of the conveyor 12 simultaneously.

FIG. 2B shows a modification of the arrangement of FIG. 2D in that the belt is provided with transverse slats 88. These have a similar effect to the rubber flaps of the embodiment of FIG. 2B and the mode of operation is also similar.

In the modification illustrated in FIG. 2B airflow is limited by a rubber flap 90 depending from a sheet member 92 itself secured to an under-surface of the interior of the casing 21. Although believed to be satisfactory in operation, there is a risk that progress of the beans and leaves of the bean plants will be retared if the flap exerts too much influence thereon or alternatively that if the flap is sufficiently flexible it will be deflected by the suction applied. It will be noted that this flap 90 is spaced from the end of the first conveyor and this has the advantage that any air leakage at the rubber flap will have a reduced velocity by the time it reaches the narrowest point between the casing and the roller of the first conveyor.

Figure 2G:
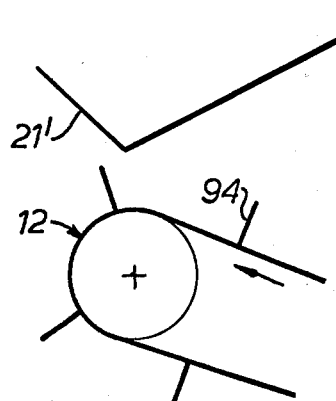

In the modification illustrated in FIG. 2G the belt of the first conveyor 12 is itself provided with slats 94 which are rigid and will tend to prevent any airflow passing between the conveyor and the upper stationary casing because of the protective effect that the slats exert.

Figure 2H:
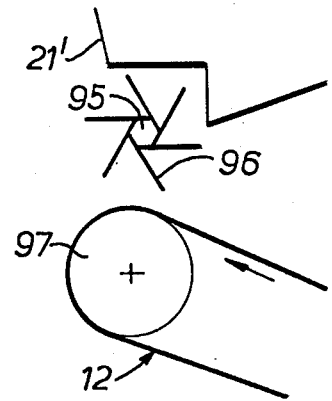

In the final modification illustrated in FIG. 2H, the valve means comprises a hexagonal section shaft 95 to each flat of which a flexible rubber flap 96 is secured. The upper roller 97 of the conveyor 12 should have a larger diameter than that of the lower roller and the centre of the shaft 95 is displaced rearwardly of the centre line of the upper roller 97 of the belt 12. With this valve means the belt 12 preferably has no slats or flights, but the operative surface must then be rough. This alternative reduces turbulence adjacent the valve and excessive turbulence in the vertical passage carrying airflow 29 can be reduced by curved air guide 29' extending along one side of one edge of the transverse conveyor 9.

As hereinbefore referred to, it is important that in operation the picking reel shall maintain the required level at all times since otherwise the pick-up reel will either tend to pick up dirt and stones as well as crop, if too low, or will miss valuable crop is too high. A levelling system as disclosed in our co-pending application No. 25310/75 (Mobile Pea) can be incorporated in the bean harvester in accordance with the invention and one skid or ski of such a system is indicated at 60 in FIG. 1A. Alternatively, sensing rollers or wheels can be used.

A dirt scraper will be mounted to remove dirt from each roller or wheel. As in the ski construction the wheels will be made adjustable for height.

Figure 5:
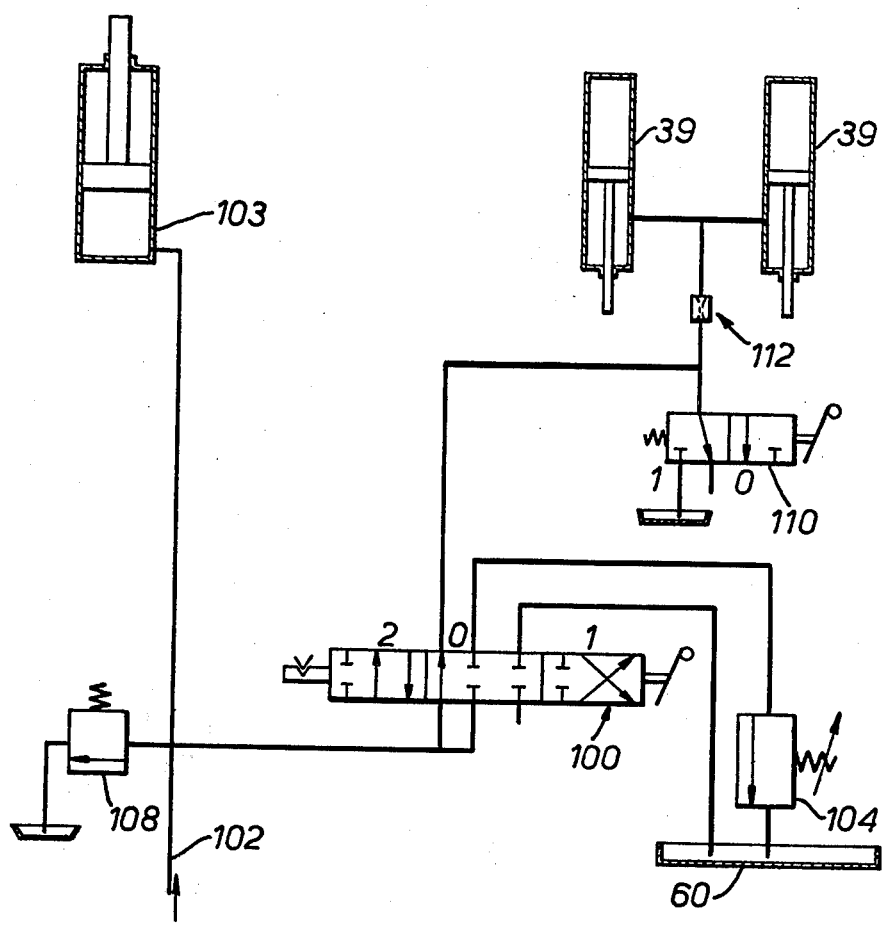
FIG. 5 is a diagram of a hydraulic system for controlling the level of a pick-up device of the harvester assembly and for actuating pick-up device lifting cylinders.

As mentioned above, the position controll of the full width first cleaning stage is combined with the pickup levelling system (See FIG. 5).

When a valve 100 of the levelling circuit is in position "2", a continuous oil flow from line 102 provides accurate levelling of the pick-up device by means of cylinders 103 (only one shown), leaving a small amount of the pick-up device weight on the ground-sensing skids 60 (FIG. 1A) or wheels, as controlled by an adjustable relief valve 104. Actuators 39 for the cleaning fan arrangement are then retracted and shut off from the system.

By means of the valve 100, the pick-up device can be lifted when setting the valve in position "0" as then the adjustable relief valve 104 is shut off and only a higher set relief valve 108 provides enough pressure to lift the complete pick-up device. In this position also the fan actuators 39 remain retracted.

When the machine has to drive for a long period of time on the road, the pick-up device is mechanically locked and the valve 100 switched into position "1" so that the oil returns unrestricted to the oil tank. For better visibility for the driver a spring-actuated 3/2 valve 110 is switched into the "1" position connecting the fan actuators 39 with the oil tank (not shown) via a flow-restricting valve 112 serving to control the speed of the downwards movement of the cleaning fan arrangement under its own weight. Whenever the pick-up is lowered again for operation, position "2" of valve 100, the oil is immediately directed to the fan-actuators 39 so that the cleaning arrangement will always be in the working position. The 3/2 valve 110 is therefore provided as a spring-actuated valve which reinstates the initial "0" position (disconnecting the oil tank) when the lever thereof is released.

The mode of operation of the bean harvester as hereinbefore described is as follows:

The rotary pick-up reel 11 rotates, as viewed in FIG. 1A, in the anti-clockwise sense and bean plants are up-rooted by the tines 13 thereof and are projected within the casing 21 onto the upwardly and rearwardly moving upper run of the first conveyor 12. Below the casing 21, the lower roller of the belt 12 lies closely adjacent the periphery of the tines 13 of the reel and at less than one half of the height of the reel thereby preventing losses. The speed of rotation of the reel is such that plant material follows trajectories on to the upper run of the conveyor 12. The belt 12 has a width at least equal to the width of the reel, which is itself at least as wide as the carrying tractor, so that the plant material is not concentrated at the first cleaning stage or section 14.

At the first cleaning stage the fan bank 16 serves to draw upwardly an air flow as indicated by broken line arrows 29, the air being drawn in between the upper one 97 of the two rollers of the conveyor 12 and the support structure of the transverse conveyor 9. The rotary valve 25 (or its modifications) having flexible flaps (or equivalents) permits the passage of plant material into the first cleaning stage without drawing substantial quantities of air from within the casing 21. If excessive air were to be drawn from the casing 21 the separation would be adversely affected. By provision of the bank of fans 16 and the correspondingly wide casing, the thin distribution of the plant material provided by the belt 12 is maintained at the cleaning section itself and leaves, stems and dirt are drawn upwardly by the bank of fans whilst the relatively heavier and less aerodynamically susceptible beans themselves fall onto the transverse conveyor 9. The shape of the passage limiting airflow 29 is such that vortices are produced approximately at the level of the rotary valve 25 or a little above that level so that the leaves and lighter material are taken up in the air flow whilst the heavier beans fall onto the conveyor. However, excessive turbulence is prevented by the air guide 29'. Some vortices are desirable because, under certain conditions it is possible that a bean, particularly if resting on a leaf and lying transversely to the air flow, will be carried upwardly. If, however, it passes through a vortex the effective surface area will be substantially reduced as the bean moves into alignment with the general direction of the air flow and will fall, as is required to avoid losses. Because of the large cross-sectional area of this passage (extending across the full width of the harvester) the air velocities are kept low and the discharge through the ducting 35 and diffuser 37 is such that even under dry conditions dust problems are not created. The removed material is returned directly onto the field from which the beans have just been removed.

The beans and remaining dirt, leaves and stems received on the conveyor 9 are discharged onto the longitudinally-extending third conveyor 18.

The second cleaning stage or section 22 is provided at the downstream end of the conveyor 18 and the upstream end of the elevator conveyor 24. The fan 22 provides within associated ducting an upwardly-directed air flow so that dirt, leaves and other items are drawn upwardly while the beans are received on the flights of the conveyor 24. At this second cleaning stage the mass flow of air is substantially less than at the first cleaning stage, but as will be appreciated the amount of material to be removed is also substantially smaller. As for the first cleaning stage, the material is discharged directly onto the ground which has just been harvested.

As will be apparent from the position of the eyes 32 of the tractor driver, he will have a good view of the material as it is conveyed along the conveyor 18 and since, under proper operational conditions a very substantial part of the trash is removed, he can readily assess by eye if any malfunction is occurring at the first cleaning stage.

The elevator conveyor 24 discharges on to the transverse conveyor 56 which in turn discharges into the hopper 26 and the discharge zone between the conveyors 24 and 56 may also constitute a third cleaning stage. If the third stage is incorporated the fan 47 provides an upwardly-directed air flow which serves to remove any remaining dirt and leaves, stalks and so on and these are discharged downwardly laterally of the hopper on to the ground which has just been harvested.

When the hopper 26 has received a full complement of beans it is raised and tilted by means of the hydraulic actuators 52 to discharge the beans into a lorry or trailer drawn up alongside the harvester. This discharge is considerably aided by the embodiment of hopper with one moving wall.

As will be appreciated from the description given hereinbefore the mounting of the harvester onto a conventional tractor gives rise to no great difficulties with regard to balance of the tractor since the weight of the pick-up assembly 10 at the front of the tractor 30 is substantially counter-balanced by the overhanging hopper 26 and other parts of the assembly at the rear of the tractor.

As already discussed, the levelling system ensures that irrespective of undulations the reel 11 will be kept at substantially the same height from the ground under all operational conditions.

Because of the provision of the hydraulic actuators 52 which raise the hopper before discharge, the vehicle receiving the beans can be any convenient height and a special low-loader trailer is not necessary.

Other advantages of the harvester assembly as hereinbefore particularly described are that the overall height of the harvester assembly when mounted on the tractor is kept to a reasonable level, the conveyors, even the elevating conveyor 24 leading to the hopper are not steeply inclined, the use of a conventional tractor provides for considerable flexibility from the viewpoint of general farming. If a four-wheel drive tractor is used the well-distributed weight of the harvester assembly will improve traction. Furthermore, a conventional tractor usually has a very good turning circle and the harvester assembly does nothing to interfere with this turning circle and consequent manoeuverability. The drive for the harvester assembly presents no difficulties since it is readily possible to make use of the conventional power take-off shaft of the tractor to drive hydraulic pumps and hence hydraulic motors coupled to simple chain and/or shaft drives (not shown in the drawings) to the individual components.

Other advantages of the harvester assembly are that the driver has good visibility not only of the field ahead but of the individual components of the harvester assembly which lie ahead of him, the possibility of four-wheel drive plus a relatively light construction ensures that the harvester assembly can be used even under adverse weather conditions, the arrangement of a triple cleaning of the harvested material ensures that even bean varieties which are difficult to harvest and clean can be accommodated and finally the harvester assembly has a high efficiency both with regard to capacity and the condition of the harvested beans when they are delivered from the hopper.

Although not directly connected with the harvesting operation, the provision of hydraulic actuators to lower the full width cleaning arrangement ensures that the visibility when the tractor is being driven along a road is not impaired.

The levelling system fully described in our co-pending British application No. 25310/75 (Mobile Pea) ensures efficiency in the picking up of the bean crop and its similicity ensures satisfactory operation under agricultural conditions. The arrangement of pick-up reel and the conveyors enable continued efficient operation irrespective of the adjustment of the reel to accommodate sloping and/or uneven ground.

In an unillustrated modification the second cleaning stage can be omitted so that the illustrated first and third stages become the only stages incorporated.

Although the best mode contemplated for carrying out the present invention has been herein to shown and described, it will be apparent that modification and variation can be made without departing from what is regarded to be the subject matter of the invention.

We claim:

1. A bean harvester assembly arranged for mounting on a tractor, said assembly comprising a casing enclosing; the upper peripheral portion of a crop pick-up device, a first generally horizontal rearwardly extending conveyor arranged to receive crop and trash such as leaves and vine fragments from said pick-up device and a second conveyor disposed transversely to and positioned to receive crop and a portion of the trash discharged by said first conveyor and transport them laterally relative to said first conveyor; said casing having a rearwardly extending wall overlying said first conveyor and including an inclined downwardly directed portion terminating in an edge above the discharge end of said first conveyor, said first conveyor together with the edge of said casing portion defining a generally rectangular passageway through which crop and trash are discharged for reception by said second conveyor, means forming a closure for said rectangular passageway for restricting the passage of air therethrough while allowing the passage of crop and trash, said second conveyor lying below said first conveyor a sufficient distance to form an opening therebetween, means for producing high velocity air flow traveling in an upwardly directed path through said opening between the first and second conveyors such that air currents pass in substantial cross current relationship with the crop and trash traveling downwardly from said first to said second conveyor, said air currents entraining and removing a substantial portion of the trash from the heavier subsequently collected crop, a third conveyor having its inlet underlying the discharge end of said second conveyor and positioned normally with respect thereto to convey crop and remaining trash in a direction opposite to the direction of tractor movement, an elevating conveyor in longitudinal alignment with said third conveyor and having its inlet underlying and vertically downwardly spaced from the discharge of said third conveyor to produce a gap, means for producing upwardly flowing high velocity air currents traversing said gap to thereby entrain and remove additional trash from the crop to be collected, and storage means for collecting the crop conveyed thereto by said fourth conveyor.

2. An assembly according to claim 1 wherein the pick-up device and the first, rearwardly-extending, conveyor extend across the full width of the assembly, said second, transverse, conveyor serving to concentrate the heavier crop elements and to deliver these elements to the third, rearwardly extending, conveyor extending laterally of and parallel to the longitudinal centre line of the assembly.

3. An assembly according to claim 1 wherein the closure arrangement comprises a rotary vaned member.

4. An assembly according to claim 1 wherein the closure arrangement comprises a flexible flap member.

5. An assembly according to claim 1 wherein the closure arrangement comprises a rotary brush of generally cylindrical outline.

6. An assembly according to claim 1 wherein the pick-up device, the first conveyor, the closure arrangement and the means producing high velocity air flow are arranged as a sub-assembly, and means is provided which mount the sub-assembly for pivotal movement relative to remaining parts of the harvester assembly whereby to increase visibility when the harvester is traveling to or from a working site.

7. An assembly according to claim 1, wherein the storage means comprises a hopper arranged at the end of the harvester assembly remote from the pick-up device.

8. An assembly according to claim 7, comprising a further transverse conveyor extending across the hopper and a second means including a suction device mounted at a transfer zone between the fourth conveyor and said further transverse conveyor whereby to remove remaining trash before the heavier elements of the crop are discharged into the hopper.

9. An assembly according to claim 8 wherein the closure arrangement comprises an auxiliary conveyor belt assembly incorporating a plurality of spaced flexible flaps upstanding from the belt surface.

10. An assembly according to claim 7 comprising a linkage and actuators for raising and tilting the hopper in order to discharge its contents.

11. An assembly according to claim 1 wherein said first conveyor comprises a belt having a plurality of upstanding flights of resilient material mounted at spaced intervals therealong.

* * * * *